(12) United States Patent
Estrada

(10) Patent No.: US 8,826,127 B2
(45) Date of Patent: *Sep. 2, 2014

(54) SYSTEM AND METHOD FOR REPRESENTATION OF MULTIPLE RELATED OBJECTS WITHIN A WEB FEED

(75) Inventor: Antonio Estrada, Nashua, NH (US)

(73) Assignee: International Business Machines Corporation, Armonk, NY (US)

( * ) Notice: Subject to any disclaimer, the term of this patent is extended or adjusted under 35 U.S.C. 154(b) by 972 days.

This patent is subject to a terminal disclaimer.

(21) Appl. No.: 11/967,785

(22) Filed: Dec. 31, 2007

(65) Prior Publication Data

US 2009/0172073 A1 Jul. 2, 2009

(51) Int. Cl.
*G06F 17/00* (2006.01)

(52) U.S. Cl.
USPC ........... 715/277; 715/749; 715/764; 715/236; 715/273; 715/203; 715/234; 709/219; 709/206; 709/246; 709/204

(58) Field of Classification Search
USPC ......... 715/273, 203, 234, 764, 277, 749, 236; 705/5; 707/3, 602; 709/219, 206, 246, 709/204
See application file for complete search history.

(56) References Cited

U.S. PATENT DOCUMENTS

| | | | |
|---|---|---|---|
| 2005/0267973 A1* | 12/2005 | Carlson et al. | 709/228 |
| 2005/0289468 A1* | 12/2005 | Kahn et al. | 715/738 |
| 2006/0259462 A1* | 11/2006 | Timmons | 707/3 |
| 2007/0083520 A1* | 4/2007 | Shellen et al. | 707/10 |
| 2007/0094365 A1* | 4/2007 | Nussey et al. | 709/223 |
| 2007/0198526 A1* | 8/2007 | Pitkow | 707/10 |
| 2007/0245020 A1* | 10/2007 | Ott | 709/225 |
| 2007/0265857 A1* | 11/2007 | Shivaji Rao | 705/1 |
| 2008/0126476 A1* | 5/2008 | Nicholas et al. | 709/203 |
| 2008/0147621 A1* | 6/2008 | Newman | 707/3 |
| 2008/0201118 A1* | 8/2008 | Luo | 703/2 |
| 2009/0172773 A1* | 7/2009 | Moore | 726/1 |
| 2009/0320035 A1* | 12/2009 | Ahlgren et al. | 718/104 |
| 2012/0276883 A1* | 11/2012 | Counts et al. | 455/414.1 |

* cited by examiner

*Primary Examiner* — Quoc A Tran
(74) *Attorney, Agent, or Firm* — Holland & Knight LLP; Brian J. Colandreo, Esq.; Jeffrey T. Placker, Esq.

(57) ABSTRACT

A method and computer program product for processing a data page to be provided to one or more remote devices via a data feed. A determination is made concerning whether the data page includes two or more data objects. If the data page includes two or more data objects, a page entry for the data page is defined; and a separate object entry for at least one of the two or more data objects included within the data page is defined. The object entry is associated with the page entry.

18 Claims, 4 Drawing Sheets

150

```
<?xml version="1.0" encoding="utf-8"?>
<feed xmlns="http://www.w3.org/2005/Atom">
<id>http://tevt60p/QuickPlace/uploads04/Main.nsf/h_Discussion/47891A2AC603E03405256708001672O1/?OpenDocument&Form=h.
<title>uploads04</title>
<link rel='self' type='application/atom+xml' href='http://tevt60p/QuickPlace/uploads04/Main.nsf/h_Discussion/47B91A2AC6(
<link rel='alternate' type='text/xml' href='http://tevt60p/QuickPlace/uploads04/Main.nsf/h_Discussion/47B91A2AC603E0340!
<generator version='800000.000' uri='http://tevt60p/QuickPlace/uploads04/Main.nsf/h_Discussion/47891A2AC60340525670B(
```

160

```
<entry>
<id>0F7F78B411663465852572DB00775018</id>
<title>    Tony's Team Page       </title>
<published>2007-05-14T17:43:12Z</published>
<updated>2007-05-18T15:35:46Z</updated>
<author>
<name>tony</name>
</author>
<link rel='self' type='application/atom+xml' href='http://tevt60p/QuickPlace/uploads04/Main.nsf/h_Discussion/47B91A2AC6(
<link rel='alternate' type='text/xml' href='http://tevt60p/QuickPlace/uploads04/Main.nsf/$defaultview/OF7F78B4116634658!
<summary></summary>
<content type='text/xml'></content>
</entry>
```

164

152

```
<entry>
<id>0F7F78B411663465852572DB00775018.1</id>
<title>TEST_GIF2.gif</title>
<published>2007-05-14T17:43:12Z</published>
<updated>2007-05-18T15:35:46Z</updated>
<author>
<name>tony</name>
</author>
<link rel='self' type='application/atom+xml' href='http://tevt60p/QuickPlace/uploads04/Main.nsf/h_Discussion/47B91A2AC6(
<link rel='alternate' type='image/gif' title='TEST_GIF2.gif' href='http://tevt60p/QuickPlace/uploads04/Main.nsf/$defaul'
<link rel='enclosure' type='image/gif' title='TEST_GIF2.gif' href='http://tevt60p/QuickPlace/uploads04/Main.nsf/$defaul'
<summary></summary>
<content type='text/xml'></content>
</entry>
```

166

154

```
<entry>
<id>0F7F78B411663465852572DB00775018.2</id>
<title>banesto error.txt</title>
<published>2007-05-14T17:43:12Z</published>
<updated>2007-05-18T15:35:46Z</updated>
<author>
<name>tony</name>
</author>
<link rel='self' type='application/atom+xml' href='http://tevt60p/QuickPlace/uploads04/Main.nsf/h_Discussion/47B91A2AC6(
<link rel='alternate' type='application/unknown' title='banesto error.txt' href='http://tevt60p/QuickPlace/uploads04/Ma'
<link rel='enclosure' type='application/unknown' title='banesto error.txt' href='http://tevt60p/QuickPlace/uploads04/Ma'
<summary></summary>
<content type='text/xml'></content>
</entry>
```

168

156

```
<entry>
<id>0F7F78B411663465852572DB00775018.3</id>
<title>ID308 QuickPlace Rocks - ISSL.ppt</title>
<published>2007-05-14T17:43:12Z</published>
<updated>2007-05-18T15:35:46Z</updated>
<author>
<name>tony</name>
</author>
<link rel='self' type='application/atom+xml' href='http://tevt60p/QuickPlace/uploads04/Main.nsf/h_Discussion/47B91A2AC6(
<link rel='alternate' type='application/vnd.ms-powerpoint' title='ID308 QuickPlace Rocks - ISSL.ppt' href='http://tevt6(
<link rel='enclosure' type='application/vnd.ms-powerpoint' title='ID308 QuickPlace Rocks - ISSL.ppt' href='http://tevt6(
<summary></summary>
<content type='text/xml'></content>
</entry>
```

170

158

```
</feed>
```

SYSTEM AND METHOD FOR REPRESENTATION OF MULTIPLE RELATED OBJECTS WITHIN A WEB FEED

TECHNICAL FIELD

This disclosure relates to feeds and, more particularly, to representing multi-attachments within feeds.

BACKGROUND

Web feeds are used to distribute information to subscribers and visitors of a website. Various feed formats (e.g., RSS & Atom) may be utilized to achieve the desired data distribution. Unfortunately, some feed formats are limited in the manner in which data may be distributed. For example, problems are often encountered when trying to distribute pages that include a plurality of attachments (i.e., data objects) that are related to each other in some way yet need to be dispersed throughout the feed.

Specifically, a page represented by an Atom feed may be made up of multiple feed entries within the Atom feed, wherein each feed entry within the feed represents a data object within the page (e.g., an attachment). Unfortunately, for such an Atom feed, there is no way to reconstruct the original page composition if the original page included multiple data objects (e.g., attachments, fields, and/or metadata) and such given objects were dispersed throughout the feed rather than within a single holding object.

SUMMARY OF DISCLOSURE

In a first implementation, a method includes processing a data page to be provided to one or more remote devices via a data feed. A determination is made concerning whether the data page includes two or more data objects. If the data page includes two or more data objects, a page entry for the data page is defined; and a separate object entry for at least one of the two or more data objects included within the data page is defined. The object entry is associated with the page entry.

One or more of the following features may be included. The page entry and the object entry may be provided to at least one of the one or more remote devices. Providing the page entry and the object entry to at least one of the one or more remote devices may include publishing the page entry and the object entry to at least one of the one or more remote devices. Providing the page entry and the object entry to at least one of the one or more remote devices may include enabling availability of the page entry and the object entry to at least one of the one or more remote devices.

The data feed may be an RSS feed. The data feed may be an ATOM feed. At least one of the data objects may be an attachment. At least one of the data objects may be a data field. The page entry may include a master entry ID. The object entry may include a slave entry ID that is associated with the master entry ID. The slave entry ID may include at least a portion of the master entry ID.

In another implementation, a computer program product resides on a computer readable medium that has a plurality of instructions stored on it. When executed by a processor, the instructions cause the processor to perform operations including processing a data page to be provided to one or more remote devices via a data feed. A determination is made concerning whether the data page includes two or more data objects. If the data page includes two or more data objects, a page entry for the data page is defined; and a separate object entry for at least one of the two or more data objects included within the data page is defined. The object entry is associated with the page entry.

One or more of the following features may be included. The page entry and the object entry may be provided to at least one of the one or more remote devices. Providing the page entry and the object entry to at least one of the one or more remote devices may include publishing the page entry and the object entry to at least one of the one or more remote devices. Providing the page entry and the object entry to at least one of the one or more remote devices may include enabling availability of the page entry and the object entry to at least one of the one or more remote devices.

The data feed may be an RSS feed. The data feed may be an ATOM feed. At least one of the data objects may be an attachment. At least one of the data objects may be a data field. The page entry may include a master entry ID. The object entry may include a slave entry ID that is associated with the master entry ID. The slave entry ID may include at least a portion of the master entry ID.

The details of one or more implementations are set forth in the accompanying drawings and the description below. Other features and advantages will become apparent from the description, the drawings, and the claims.

BRIEF DESCRIPTION OF THE DRAWINGS

FIG. 3 is a diagrammatic view of a web feed generated by the feed generation process of FIG. 1.

Like reference symbols in the various drawings indicate like elements.

DETAILED DESCRIPTION OF THE PREFERRED EMBODIMENTS

Figure 1:
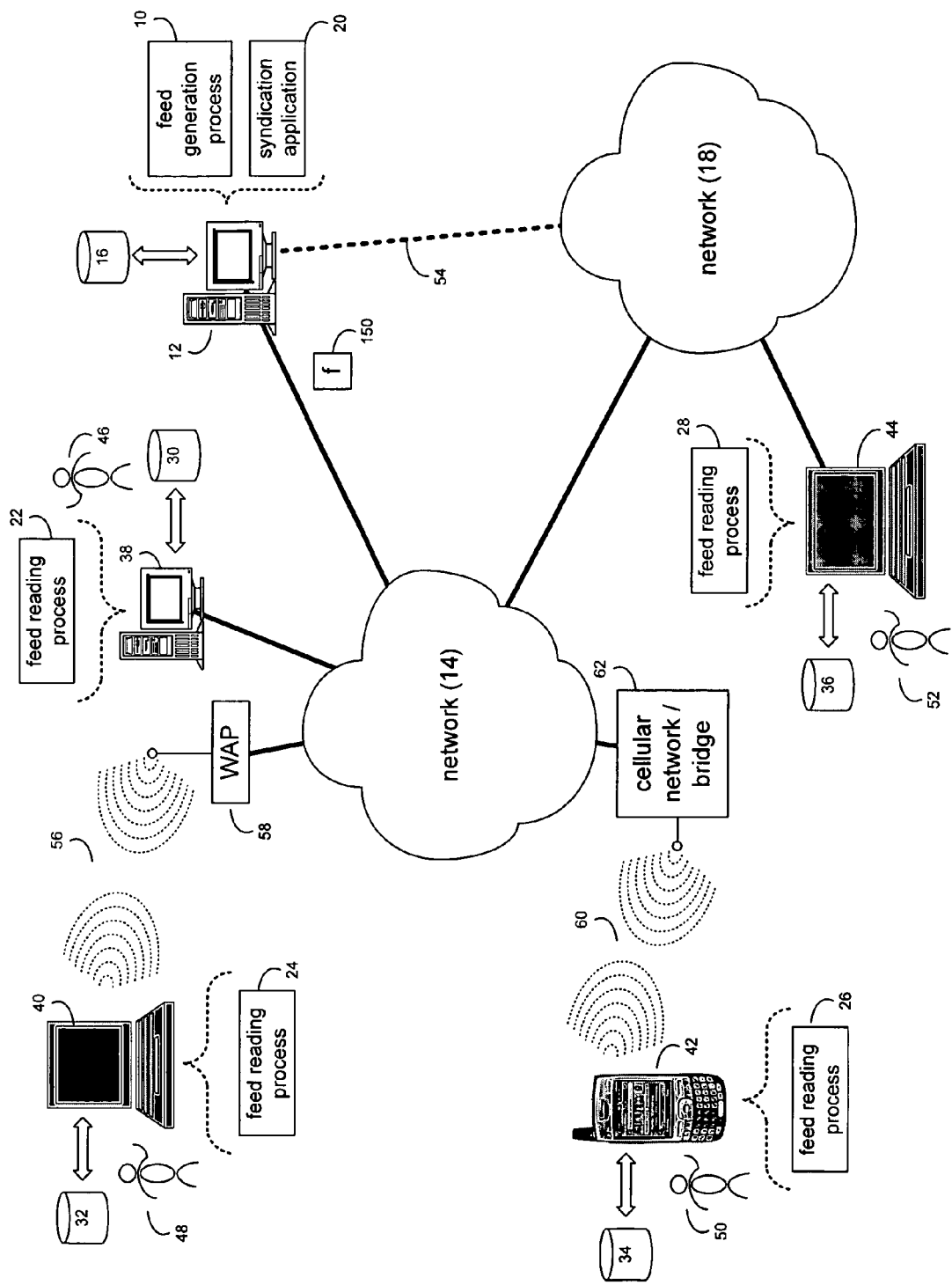
FIG. 1 is a diagrammatic view of a feed generation process and feed reading processes coupled to a distributed computing network.

System Overview:

Referring to FIG. 1, there is shown feed generation process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example.

As will be discussed below in greater detail, feed generation process 10 may process a data page to be provided to one or more remote devices via a data feed. Feed generation process 10 may determine if the data page includes two or more data objects. If so, a page entry for the data page may be defined and an object entry for at least one of the data objects included within the data page may be defined, wherein the object entry is associated with the page entry.

The instruction sets and subroutines of feed generation process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute syndication application 20, examples of which may include but are not limited to IBM Workplace Web Content Management™. Syndication application 20 may allow for the transferring of information via data feeds, such as RSS feeds and Atom feeds to one or more feed reading processes 22, 24, 26, 28, examples of which may include but are not limited to Google Reader™ and NewsGator™. Feed generation process 10 may be a stand alone application that interfaces with syndication application 20 or an applet/application that is executed within syndication application 20.

The instruction sets and subroutines of syndication application 20, which may be stored on storage device 16 coupled to server computer 12 may be executed by one or more processors (not shown) and one or more memory architectures (not shown) incorporated into server computer 12.

The instruction sets and subroutines of feed reading processes 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown). Using feed reading processes 22, 24, 26, 28, users 46, 48, 50, 52 (respectively) may access feeds provided by syndication application 20.

Users 46, 48, 50, 52 may access syndication application 20 directly through the device on which the feed reading process (e.g., feed reading processes 22, 24, 26, 28) is executed, namely client electronic devices 38, 40, 42, 44, for example. Users 46, 48, 50, 52 may access syndication application 20 directly through network 14 or through secondary network 18. Further, server computer 12 (i.e., the computer that executes syndication application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

The Feed Generation Process:

For the following discussion, feed reading process 22 is going to be described for illustrative purposes. However, this is not intended to be a limitation of this disclosure, as other feed reading processes (e.g., feed reading processes 24, 26, 28) may be equally utilized.

Figure 2:
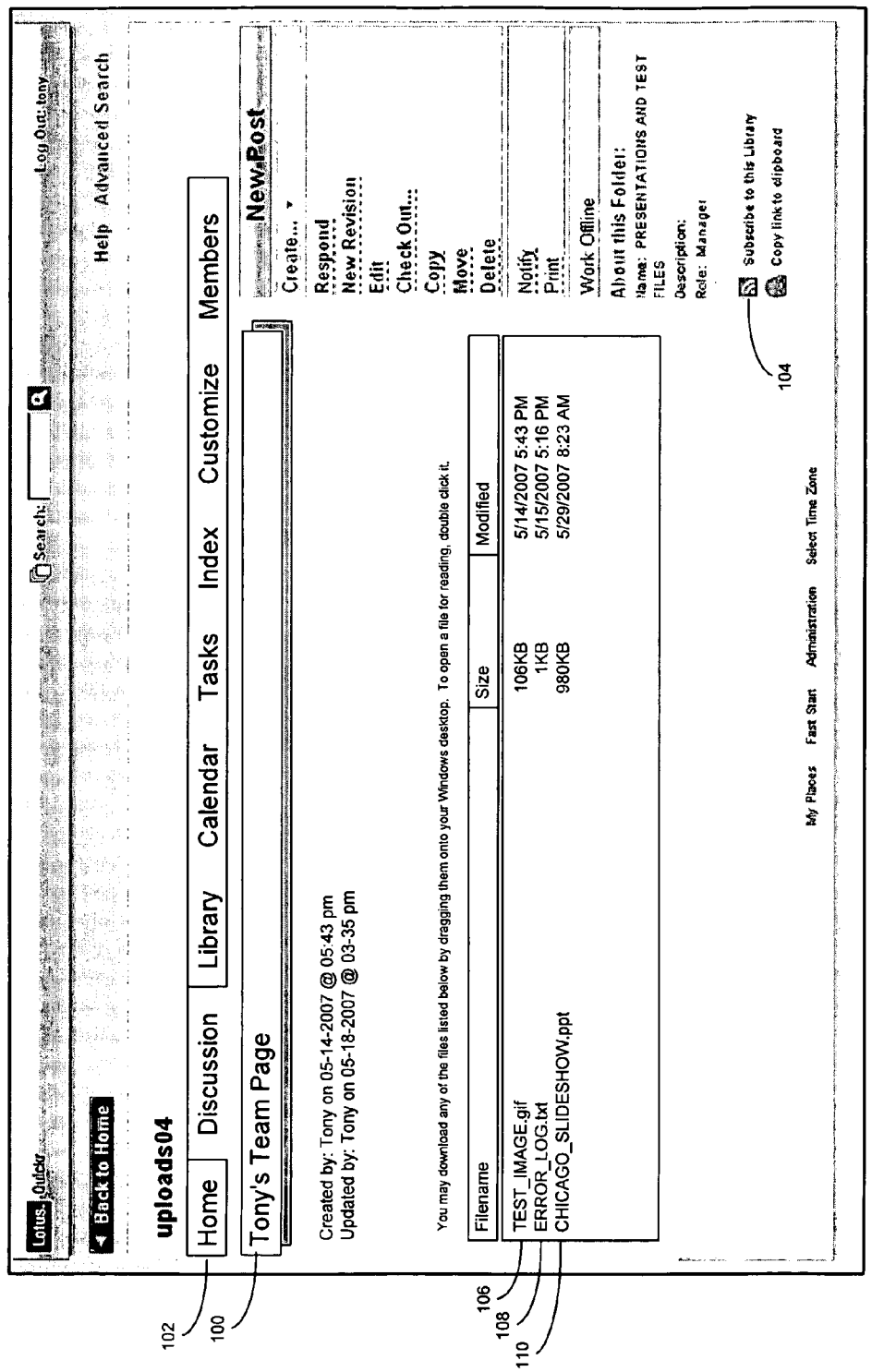
FIG. 2 is a diagrammatic view of a display screen rendered by a client electronic device.

Referring also to FIGS. 2 & 3 and as discussed above, feed generation process 10 may process 100 a data page (such as a TeamSpace™ page) to be provided to one or more remote devices (e.g., client electronic devices 38, 40, 42, 44) via a data feed (e.g., an RSS feed or an ATOM feed). As is known in the art, a TeamSpace may be a web-based collaborative workspace system for managing shared work processes and maintaining shared artifacts in a project that may span months/years. A TeamSpace may cover both synchronous and asynchronous cross-company team activities and may provide a seamless transition between various work modes.

Feed reading process 22 may allow user 46 to browse through various sites (e.g. websites and team spaces) so that user 46 may subscribe to one or more web feeds. For example, using feed reading process 22, user 46 may browse team space 100 (i.e. "Tony's Team Page"). Team space 100 may include menu bar 102 that allows user 46 to select from a plurality of sub pages, such as "Home", "Discussion", "Library", "Calendar", "Tasks", "Index", "Customize", and "Members". Team space 100 may include subscription button 104 that allows user 46 to subscribe to web feed 150.

As discussed above, web feeds may be used to distribute information to subscribers and visitors of a website. Accordingly, web feed 150 may be used to distribute information available on team space page 100. For example, team space page 100 is shown to include three files available for download, namely: Test_Image.gif; Error_Log.txt; and Chicago_Slideshow.PPT. Accordingly, through the use of web feed 150, user 46 may receive content distributed by e.g. team space page 100, including but not limited to the three files available for download, namely: Test_Image.gif; Error_Log.txt; and Chicago_Slideshow.PPT.

While the content distributor is described above is being team space page 100, this is for illustrative purposes only and is not intended to be a limitation of this disclosure, as other configurations are possible. For example, the content distributor may be a news website, a blog site, or a social networking website.

As discussed above, various feed formats (e.g., RSS & Atom) may be utilized to achieve the desired data distribution. Unfortunately, for certain feed types (e.g., Atom feeds), it is not possible to reconstruct "complex" pages (i.e., pages that include multiple data objects, such as attachments, fields, metadata, etc). Accordingly, as team space page 100 includes three attachments, this is a "complex" page that may be difficult to reconstruct when transmitted using various feed formats.

Figure 4:
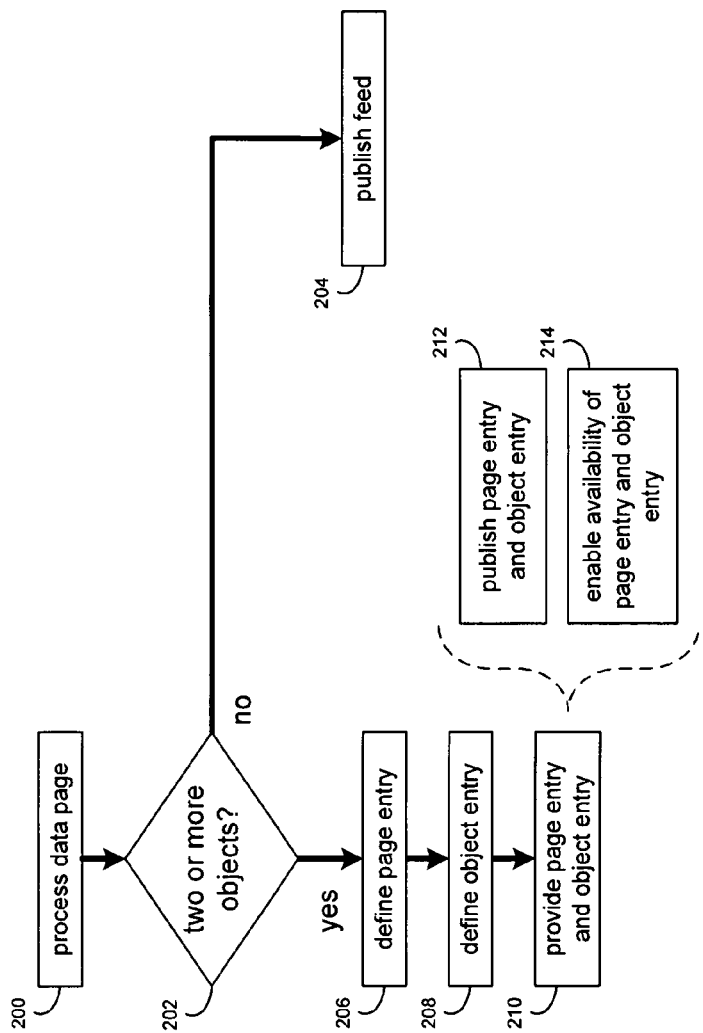
FIG. 4 is a flowchart of the feed generation process of FIG. 1.

Accordingly and referring also to FIG. 4, when a user (e.g. user 46) selects subscription button 104, thus indicating that (in this particular example) user 46 wishes to subscribe to a web feed of team space page 100, feed generation process 10 may process 200 team space page 100 (i.e. the page that is to be provided to the remote devices (e.g. personal computer 38) via data feed 150) to determine 202 whether team space page 100 includes two or more data objects. In the event that team space page 100 does not include multiple objects, feed generation process 10 may publish 204 a feed of the data included within team space page 100. However and as discussed above, since team space page 100 includes a plurality of attachments, namely: Test_Image.gif 106; Error_Log.txt 108; and Chicago_Slideshow.PPT 110, team space page 100 does indeed include two or more data objects.

Accordingly, upon feed generation process 10 determining 202 that team space page 100 includes multiple objects, feed generation process 10 may define 206 a page entry for the data page (i.e. team space page 100) and may define 208 an object entry for each of the data objects included within team space page 100 (i.e. Test_Image.gif 106; Error_Log.txt 108; and Chicago_Slideshow.PPT 110).

As is known in the art, web feeds (e.g. web feed 150) may include a plurality of feed entries. Therefore, when publishing web feed 150, feed generation process 10 may include, within web feed 150, the page entry defined 204 for team space page 100 and the object entries defined 206 for Test_Image.gif 106; Error_Log.txt 108; and Chicago_Slideshow.PPT 110.

For illustrative purposes, web feed 150 is shown to include the four above-described feed entries, namely page entry 152 (which corresponds to team space page 100), object entry 154 (which corresponds to Test_Image.gif 106), object entry 156 (which corresponds to Error_Log.txt 108), and object entry 158 (which corresponds to Chicago_Slideshow.PPT 110). When generating web feed 150, feed generation process 10 may also include additional information 160, 162 that may be required to e.g. define the feed type, define the beginning of the feed, and define the end of the feed).

Page entry 152 may define various aspects of team space page 100, such as: the title of the page ("Tony's Team Page"); the publication date of the page; and the author of the page. Each of object entries 154, 156, 158 may define various aspects of the related data object, such as: the title of the data object; the publication date of the data object; and the author of the data object.

When defining 208 the object entries (e.g., object entries 154, 156, 158), feed generation process 10 may associate each object entry defined within web feed 150 with the related page entry (e.g., page entry 152), thus allowing web feed 150 to be properly processed by feed reading process 22. For example, each page entry (e.g. page entry 152) may include a master entry ID. Further, each object entry (e.g. object entries 154, 156, 158) may include a slave entry ID that is associated with the master entry ID, and the slave entry ID included within each object entry may include at least a portion of the master entry ID.

For example and for illustrative purposes only, page entry 152 may include master ID entry 164 (i.e. 0F7F78B411663465852572DB00775018). Further, object entry 154 may include slave entry ID 166 (i.e. 0F7F78B411663465852572DB00775018.1); object entry 156 may include slave entry ID 168 (i.e., 0F7F78B411663465852572DB00775018.2); and object entry 156 may include slave entry ID 170 (i.e., 0F7F78B411663465852572DB00775018.3). In this example, slave entry IDs 166, 168, 170 are shown to be identical to master entry ID 164 with the exception that a suffix (e.g. "0.1", "0.2", "0.3", respectively) was added to each of slave entry IDs 166, 168, 170. Accordingly, the "root" portion (i.e. 0F7F78B411663465852572DB00775018) of each of slave entry IDs 166, 168, 170 is identical to that of master ID entry 164 (i.e. 0F7F78B411663465852572DB00775018). Accordingly, by using such a master entry ID/slave entry ID nomenclature, feed generation process 10 may associate each object entry (e.g., object entries 154, 156, 158) defined within web feed 150 with the related page entry (e.g., page entry 152).

The above-described master entry ID/slave entry ID nomenclature is for illustrative purposes only and is not intended to be a limitation of this disclosure, as other configurations are possible. For example, instead of attaching a suffix to each of slave entry IDs 166, 168, 170, an additional line item may be inserted into each of the corresponding object entries (namely object entries 154, 156, 158) that defines the associated page entry (namely page entry 152).

Once web feed 150 is defined, feed generation process 10 and/or syndication application 20 may provide 210 web feed 150 (which includes page entry 152 and object entries 154, 156, 158) to one or more remote devices (e.g. personal computer 38, laptop computer 40, personal digital assistant 42, notebook computer 44).

When providing web feed 150 (which includes page entry 152 and object entries 154, 156, 158) to e.g. personal computer 38, laptop computer 40, personal digital assistant 42, notebook computer 44, feed generation process 10 and/or syndication application 20 may publish 212 web feed 150 to the remote devices. Accordingly, feed generation process 10 and/or syndication application 20 may transmit web feed 150 to e.g. personal computer 38, laptop computer 40, personal digital assistant 42, notebook computer 44.

Alternatively/additionally, when providing web feed 150 (which includes page entry 152 and object entries 154, 156, 158) to e.g. personal computer 38, laptop computer 40, personal digital assistant 42, notebook computer 44, feed generation process 10 and/or syndication application 20 may enable availability 214 of web feed 150 to e.g. personal computer 38, laptop computer 40, personal digital assistant 42, notebook computer 44. Accordingly, feed generation process 10 and/or syndication application 20 may allow users of e.g. personal computer 38, laptop computer 40, personal digital assistant 42, notebook computer 44 to download/obtain a copy of web feed 150 (e.g. in a manner similar to that of a podcast).

A number of implementations have been described. Nevertheless, it will be understood that various modifications may be made. Accordingly, other implementations are within the scope of the following claims.

What is claimed is:

1. A method comprising:
   receiving, on a remote device, a data feed that includes a plurality of feed entries and at least one data page, the at least one data page represented by an Atom feed including multiple feed entries within the Atom feed, wherein each feed entry within the Atom feed represents a data object within the at least one data page, wherein the data object is an attachment;

processing the at least one data page at the remote device via the data feed;
determining when the at least one data page includes two or more data objects:
defining a page entry for the at least one data page, the page entry corresponding to the at least one data page, wherein the page entry includes a master entry ID and is within the data feed; and
defining at least one object entry for at least one of the two or more data objects included within the at least one data page;
each of the at least one defined object entries corresponding to the at least one data object, wherein each of the at least one defined object entries includes a title and a publication date corresponding to the at least one data object and an attachment for downloading, wherein each of the at least one defined object entries includes a slave entry ID corresponding to its data object and associates the slave entry ID with the master entry ID of the page entry, wherein the master entry ID is a root to each slave entry ID included in each of the at least one defined object entries within the data feed; and
generating the at least one data page on the remote device by associating each of the at least one defined object entries with the page entry based upon the master entry ID and the slave entry ID corresponding to its data object.

2. The method of claim 1 further comprising:
providing the page entry and the at least one object entry to at least one of the one or more remote devices.

3. The method of claim 2 wherein providing the page entry and the at least one object entry to at least one of the one or more remote devices includes:
publishing the page entry and the at least one object entry to at least one of the one or more remote devices.

4. The method of claim 2 wherein providing the page entry and the at least one object entry to at least one of the one or more remote devices includes:
enabling availability of the page entry and the at least one object entry to at least one of the one or more remote devices.

5. The method of claim 1 wherein the data feed is an ATOM feed.

6. The method of claim 1 wherein at least one of the data objects is a data field.

7. A computer program product residing on a non-transitory computer readable medium having a plurality of instructions stored thereon which, when executed by a processor, cause the processor to perform operations comprising:
receiving, on a remote device, a data feed that includes a plurality of feed entries and at least one data page, the at least one data page represented by an Atom feed including multiple feed entries within the Atom feed, wherein each feed entry within the Atom feed represents a data object within the at least one data page, wherein the data object is an attachment;
processing the at least one data page at the remote device via the data feed;
determining when the at least one data page includes two or more data objects:
defining a page entry for the at least one data page, the page entry corresponding to the at least one data page, wherein the page entry includes a master entry ID and is within the data feed; and
defining at least one object entry for at least one of the two or more data objects included within the at least one data page;
each of the at least one defined object entries corresponding to the at least one data object, wherein each of the at least one defined object entries includes a title and a publication date corresponding to the at least one data object and an attachment for downloading, wherein each of the at least one defined object entries includes a slave entry ID corresponding to its data object and associates the slave entry ID with the master entry ID of the page entry, wherein the master entry ID is a root to each slave entry ID included in each of the at least one defined object entries within the data feed; and
generating the at least one data page on the remote device by associating each of the at least one defined object entries with the page entry based upon the master entry ID and the slave entry ID corresponding to its data object.

8. The computer program product of claim 7 further comprising instructions for:
providing the page entry and the at least one object entry to at least one of the one or more remote devices.

9. The computer program product of claim 8 wherein providing the page entry and the at least one object entry to at least one of the one or more remote devices includes:
publishing the page entry and the at least one object entry to at least one of the one or more remote devices.

10. The computer program product of claim 8 wherein providing the page entry and the at least one object entry to at least one of the one or more remote devices includes:
enabling availability of the page entry and the at least one object entry to at least one of the one or more remote devices.

11. The computer program product of claim 7 wherein the data feed is an ATOM feed.

12. The computer program product of claim 7 wherein at least one of the data objects is a data field.

13. A method comprising:
receiving, on a remote device, a data feed that includes a plurality of feed entries and at least one data page, the at least one data page represented by an RSS feed including multiple feed entries within the RSS feed, wherein each feed entry within the RSS feed represents a data object within the at least one data page, wherein the data object is an attachment;
processing the at least one data page at the remote device via the data feed;
determining when the at least one data page includes two or more data objects:
defining a page entry for the at least one data page, the page entry corresponding to the at least one data page, wherein the page entry includes a master entry ID and is within the data feed; and
defining at least one object entry for at least one of the two or more data objects included within the at least one data page;
each of the at least one defined object entries corresponding to the at least one data object, wherein each of the at least one defined object entries includes a title and a publication date corresponding to the at least one data object and an attachment for downloading, wherein each of the at least one defined object entries includes a slave entry ID corresponding to its data object and associates the slave entry ID with the master entry ID of the page entry, wherein the master entry ID is a root to each slave entry ID included in each of the at least one defined object entries within the data feed; and generating the at least one data page on the remote device by associating each of the at least one defined object entries with the page entry based upon the master entry ID and the slave entry ID corresponding to its data object.

14. The method of claim 13 further comprising:

providing the page entry and the at least one object entry to at least one of the one or more remote devices.

15. The method of claim 14 wherein providing the page entry and the at least one object entry to at least one of the one or more remote devices includes:

publishing the page entry and the at least one object entry to at least one of the one or more remote devices.

16. The method of claim 14 wherein providing the page entry and the at least one object entry to at least one of the one or more remote devices includes:

enabling availability of the page entry and the at least one object entry to at least one of the one or more remote devices.

17. The method of claim 13 wherein the data feed is an RSS feed.

18. The method of claim 13 wherein at least one of the data objects is a data field.

* * * * *